G. R. Parker.
Chuck for Turning Lathe.
No. 65,422. Patented Jun. 4, 1867.
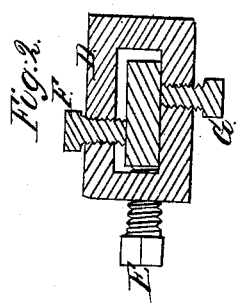
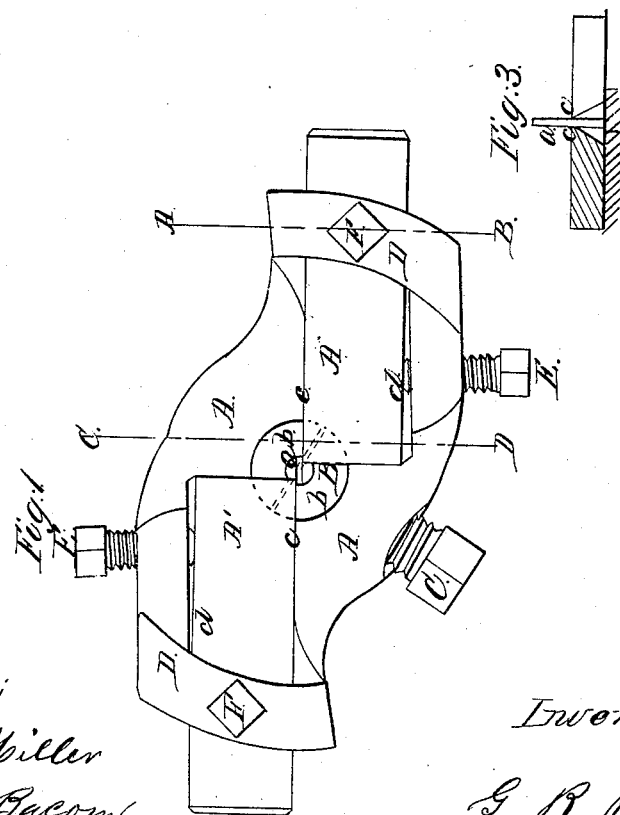
Witnesses;
Geo. H. Miller
John E. Bacon.
Inventor;
G. R. Parker.

United States Patent Office.

GARDNER R. PARKER, OF WORCESTER, MASSACHUSETTS, ASSIGNOR TO DODGE AND WELLINGTON, OF THE SAME PLACE.

*Letters Patent No. 65.422, dated June 4, 1867.*

---

IMPROVED CENTRING AND SQUARING CHUCKS.

---

*The Schedule referred to in these Letters Patent and making part of the same.*

---

TO ALL WHOM IT MAY CONCERN:

Be it known that I, GARDNER R. PARKER, of the city and county of Worcester, and Commonwealth of Massachusetts, have invented a certain new and useful Improvement in Cutter and Drill-Heads for centring and squaring the ends of metal bars for shafts, journals, and similar purposes; and I do hereby declare that the following is a full, clear, and exact description of the same, reference being had to the accompanying drawings, forming a part of this specification, in which—

Figure 1 represents a front view of a cutter and drill-head containing my improvement, and Figures 2 and 3 represent sections on lines A B and C D respectively.

My invention is an improvement on the device for centring bars of iron for which a patent was granted to N. F. Newell on the 29th of January, 1861. By Newell's plan three cutters were used in what he termed the chuck, which corresponds to my cutter-head. When three cutters are used the point of the drill cannot be supported properly, and the drill and cutters are alike liable to spring and break. By my improvement these objections are obviated.

In the drawings the part marked A has on its back a projection or hub, upon which is cut a screw-thread to screw into a plate which is to be fastened to the face-plate of a lathe. B is a slotted thimble, which is held in place by the set-screw C. The hole in the thimble B is just about the size of the drill $a$, so that when the set-screw C is turned down it compresses the slotted end of thimble B, or forces the parts $b\ b$ closer together, so much so that the drill is not only held firm but the thimble itself is also secured in the part A. The slot in the front of the thimble B is shown in dotted lines, fig. 1. The cutters A' A' are held in the slots in the ears D D, with their cutting edges $c\ c$ arranged so as to pass the drill, as shown in fig. 1. As the cutters wear off by use or grinding they are set up by the screws E E, while they are held in place by the set-screws F and G, which are so arranged in respect to their respective cutters that the cutting edges $c\ c$ of the latter can be set out to cut more or less, as may be desired. The face of the part A, against which the back of the cutters rests, is made a little thicker or inclined out so as to set the edges $c\ c$ out more than the backs $d\ d$ of the cutters, thus preventing friction, and also rendering the cutters more effective. It will be observed that the cutters A' A' pass the drill $a$ so as to give it a support on two sides, the ends of the cutters uniting to support the drill and keep it to the work, while there is no chance for the metal to force its way between the drill and the cutters.

The mode of holding the bar and feeding it to the drill and cutters is the same as that described in the patent granted to said Newell.

Again, by my improvement the head or chuck part A can be taken from the face-plate and the drill ground without taking the latter from the thimble B, which could not be done with cutters arranged after Newell's plan.

Again, as the ends of the cutters pass in by the centre point cut by the drill $a$, they are not liable to break or chip off, as they were in the Newell plan.

Having described my cutter and drill-head for centring and squaring the ends of bars and rods of iron, what I claim as new, and of my invention, and desire to secure by Letters Patent, is—

The particular combination and relative arrangement of the head A, slotted thimble B, drill $a$, and cutters A' A', substantially as and for the purposes above described.

GARDNER R. PARKER.

Witnesses:
 GEO. H. MILLER,
 JOHN E. BACON.